(12) United States Patent
Ferguson

(10) Patent No.: US 6,975,774 B2
(45) Date of Patent: Dec. 13, 2005

(54) QUANTIFYING PERCEPTUAL INFORMATION AND ENTROPY

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 680 days.

(21) Appl. No.: 10/102,406

(22) Filed: Mar. 18, 2002

(65) Prior Publication Data

US 2003/0174888 A1    Sep. 18, 2003

(51) Int. Cl.[7] .............................. G06K 9/36; G06K 9/46
(52) U.S. Cl. ...................................... 382/246; 382/248
(58) Field of Search ................................ 382/168, 170, 382/172, 191, 232, 244, 246, 248, 250, 199, 382/251; 375/240.03, 240.18, 240.2; 341/50, 341/65, 107; 704/500; 348/192; 380/200; 381/2

(56) References Cited

U.S. PATENT DOCUMENTS

| | | | | |
|---|---|---|---|---|
| 5,717,764 | A * | 2/1998 | Johnston et al. ............... | 381/2 |
| 6,198,412 | B1 * | 3/2001 | Goyal ........................... | 341/50 |
| 6,246,435 | B1 * | 6/2001 | Patel ............................ | 348/192 |
| 6,253,185 | B1 * | 6/2001 | Arean et al. .................. | 704/500 |
| 6,345,125 | B2 * | 2/2002 | Goyal et al. .................. | 382/251 |
| 6,411,740 | B1 * | 6/2002 | Daly ............................ | 382/251 |
| 6,795,580 | B1 * | 9/2004 | Janko et al. .................. | 382/199 |
| 2003/0152284 | A1 * | 8/2003 | Ferguson ...................... | 382/274 |
| 2004/0037421 | A1 * | 2/2004 | Truman ........................ | 380/200 |

OTHER PUBLICATIONS

Jayant et al., "Signal compression based on models of Human perception", Oct. 1993, vol. 81, No. 10, pp. 1385-1422.*
David Salomon, "data compression", 1998 Spring-Verlag, ISBN 0-387-95045-1, pp. 64-65.*
W. David Gregg, The University of Texas at Austin, "Analog and Digital Communication—Concepts, Systems, Applications, and Services in Electrical Dissemination of Aural, Visual, and Data Information", p. 518 & 540.

* cited by examiner

Primary Examiner—Andrew W. Johns
Assistant Examiner—Amir Alavi
(74) Attorney, Agent, or Firm—Francis I. Gray; Matthew D. Rabdau

(57) ABSTRACT

A method of quantifying perceptual information and entropy for a data input signal uses an appropriate perceptual model to produce a perceptual response. The perceptual response is then entropy converted to produce the perceptual information and entropy. The entropy conversion may include the application of a transform function, such as a Karhunen-Loeve transform function, to the perceptual response to produce a set of coefficients, which coefficients then have probabilities calculated for them based on coefficient histograms of massive tests. The probabilities are used to calculate the perceptual information and entropy using standard techniques. The perceptual information and entropy may be used in applications for achieving greater accuracy subjective quality determinations for the data input signal.

8 Claims, 1 Drawing Sheet

QUANTIFYING PERCEPTUAL INFORMATION AND ENTROPY

BACKGROUND OF THE INVENTION

The present invention relates to video/audio quality of service, and more particularly to a method of quantifying perceptual information and entropy in order to solve various video/audio quality of service problems.

In communication systems, whether video, audio or both, the quality of the video/audio is measured in several ways. Quality implies subjective quality, a function of perceptual response to a signal. One method of quality measurement is a signal subjective quality degradation measurement that uses a reduced reference, i.e. a single number or compact set, such as that described in U.S. Pat. No. 6,246,435 issued Jun. 12, 2001 to Kamalesh Patel entitled "In-Service Realtime Picture Quality Analysis." Another method uses a single-ended signal quality measurement where there is no reference, such as that described in pending U.S. patent application Ser. No. 09/152,495 filed Sep. 10, 1998 by Bozidar Janko et al entitled "Picture Quality Measurements Using Blockiness." Also an upper quality bound of a communication channel is often desired to determine if perceptually transparent (perfect) transmission is possible over the communication channel with known bandwidth and, if not, what level of perceptual degradation may be expected. Finally for a band-limited channel or where a limited number of bits represent a signal, the optimum perceptual encoding is desired to minimize the perceptual difference between the original and encoded signals similar to that described in pending U.S. patent application Ser. No. 09/369,234 filed Aug. 5, 1999 by Stephen Maurer entitled "Maximizing Usable Bandwidth in Systems Carrying Compressed Digital Signals."

What is desired is a method for estimating/quantifying the minimum theoretical bit rate required to transmit video or audio signals over a communications channel, which facilitates improving existing communications channel quality measurements to provide more accurate quality estimates.

BRIEF SUMMARY OF THE INVENTION

Accordingly the present invention provides a method of quantifying perceptual information and entropy that uses an appropriate perceptual model to produce a perceptual response for a data input signal. The perceptual response is then entropy converted to produce the perceptual information and entropy. The entropy conversion may use methods similar to those in JPEG and MPEG compression: the application of a transform function, such as a Karhunen-Loeve or cosine transforms, to the perceptual response to produce a set of coefficients, which coefficients then have probabilities calculated for them based on coefficient histograms of massive tests, such as those used to produce the data set for Huffman coding in JPEG/MPEG. The probabilities are used to calculate the perceptual information and entropy using standard techniques for calculating information and entropy as a function of probabilities. The perceptual information and entropy may be used in many applications for achieving greater accuracy of the minimum bit rate required to transmit the data input signal for an ideal codec. The efficiency of a codec under test may be measured by comparing input and output perceptual entropies.

The objects, advantages and other novel features of the present invention are apparent from the following detailed description when read in conjunction with the appended claims and attached drawing.

DETAILED DESCRIPTION OF THE INVENTION

Figure 1:
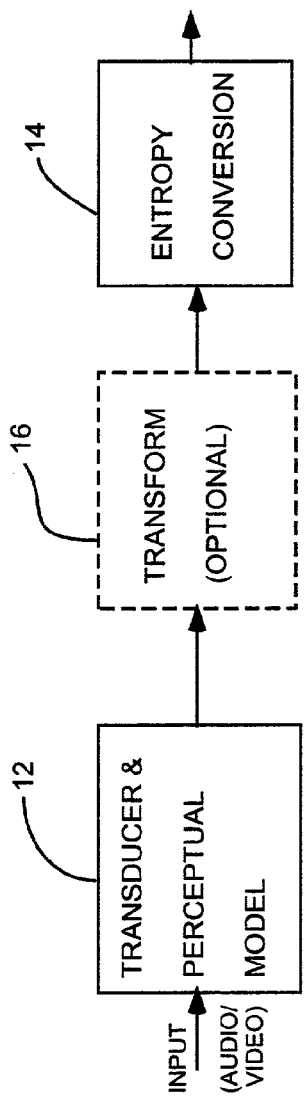
FIG. 1 is a process flow view for quantifying perceptual information and entropy according to the present invention.

Referring now to FIG. 1 a data input signal, such as a video or audio signal, is input to a transducer and perceptual model module 12 which converts the data input signal into a perceptual response for the data input signal, as is well-known in the art. One example from the video field is illustrated by U.S. patent application Ser. No. 10/076,853 filed Feb. 14, 2002 by Kevin Ferguson entitled "Predicting Human Vision Perception and Perceptual Difference", where the output from the test signal path is the perceptual response for the data input signal. The resulting perceptual response may be processed by an entropy conversion module 14 to produce a single number representing the entropy or perceptual information content of the data input signal. The greater the entropy number, the greater the perceptual information content. Preferably an optimal (optional) transform module 16 reduces the perceptual response to a group of coefficients which are then input to the entropy conversion module 14.

As an example display/video or speaker/audio perceptual models are used by the transducer and perceptual model module 12 to obtain the perceptual response to the data (video/audio) input signal, the perceptual response in the case of video being a perceptual image map. A Karhunen-Loeve (KL) transform may be used by the optimal transform module 16, or an approximation thereof, to obtain coefficients from the perceptual response with maximum variance, giving maximum energy compaction and minimum rate distortion among all unitary transforms as well as optimum statistics for entropy encoding. See Anil K. Jain, "Fundamentals of Digital Image Processing" Prentice Hall, 1986 pages 163–174. The entropy conversion module 14 calculates probabilities of coefficient amplitudes based on coefficient histograms of massive tests. This is equivalent to the implicit probabilities required for producing existing entropy encoding schemes, such as Huffman and arithmetic encoding used in JPEG, MPEG and other compression methods. From the probabilities the information and entropy content of the data input signal is calculated using standard methods (see W. David Gregg, "Analog & Digital Communication" John Wiley 7 Sons, 1977 pages 507–513):

Information $(I) = N^* \text{sumOver}(i=0 \text{ to } M, p(i)^* \log_2(1/p(i)))$ bits Entropy $(H) = \text{sumOver}(i=0 \text{ to } M, p(i)^* \log_2(1/p(i)))$ bits where M is the number of coefficients, N is the number of "images", frames or the like in the data input signal and p(i) represents the probabilities.

In a first application for determining a signal subjective quality degradation measurement, the perceptual information and entropy of the reference or source signal is determined at a transmission end and sent to a receiver end for comparison with the perceptual information and entropy of the corresponding degraded or test signal. The perceptual information and entropy difference between the reference and test signals may be converted to a standard quality measurement metric—the greater the difference the greater the degradation. The result is that less data is transmitted regarding the reference signal—only the perceptual information and entropy numbers, while more accurate correlations to subjective data quality estimates are achieved.

Likewise for single-ended measurements where no information about the reference or source signal is available, the perceptual information and entropy may be combined with perceptual blockiness, blurring and other measures of degradation to determine correlations with subjective ratings and/or dual ended measures. Again more accurate correlations to subjective data quality estimates may be achieved.

In a second application the upper bound of the perceptual quality of signals sent through a communication channel may be determined by the channel capacity (C) as a function of channel bandwidth (B) and signal-to-noise ratio (S/N), i.e., $C=Blog_2(1+S/(N*B))$ (see W. David Gregg "Analog & Digital Communication" John Wiley & Sons, Inc. (1977) equation 14-128, page 540), and the corresponding maximum perceptual entropy rate—$C= rH(s_i)_{max}$ (see Gregg equation 14-80, page 518)—based on the general definition used by C. E. Shannon, "A Mathematical Theory of Communication" *Bell System Tech J.*, Vol. 27 (July 1948). Therefore the best quality that may be achieved, given the channel's capacity, may be determined regardless of compression method or other encoding applied without using sample video or audio material which may or may not stress the system.

Figure 2:
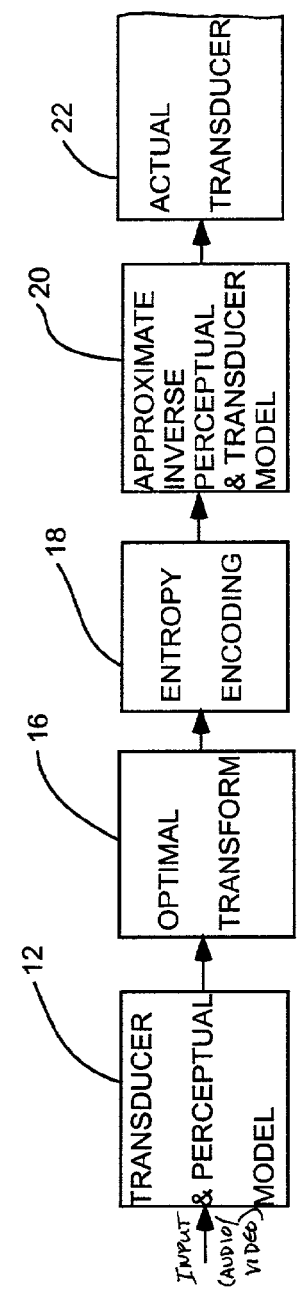
FIG. 2 is a process flow view for optimal perceptual encoding according to the present invention.

In a third application to provide optimum perceptual encoding, entropy encoding is applied to the perceptual response, followed by an approximate inverse perceptual model, as shown in FIG. 2. In this instance the input signal (video and/or audio) is processed by the transducer and perceptual model 14, processed by the optimal transform 16 for optimal statistical energy compaction, such as the K-L transform, and processed by an entropy encoding module 18, such as Huffmann encoding. The transform 16 and encoding 18 parallel JPEG/MPEG compression encoding. The resulting entropy from the encoding module 18 is processed by an approximate inverse perceptual and transducer model 20 to produce a perceptually adjusted input signal to an actual transducer 22 for optimal perceptual encoding. This takes advantage of the efficiency of entropy encoding perceptual response rather than using perceptual response in a feedback loop or using perceptual-based preprocessing of the signal prior to using standard signal entropy encoding, which does not take into consideration the probabilities of perceptual response data.

Finally for evaluating a compression method, a test signal is used with greater than or equal perceptual information or entropy than could possibly be compressed without perceptual loss, based on a given bit rate of the compressor output, and the perceptual entropy rate of the compressed signal is measured and compared to the bit rate. Optimal compression gives an entropy rate at the given bit rate. Therefore the rating of the signals are relative to an optimum rather than depending on subjectively qualified signals that have subjectively quantified characteristics (motion, luminance variance, etc.) to stress a compression encoder at an unknown rate such that the output is subjectively rated and all ratings are relative to each other rather than to an optimum.

Thus the present invention provides a method of quantifying perceptual information and entropy by converting a data input signal to a perceptual response map, optionally transforming the perceptual response map to coefficients, and entropy converting the coefficients using probabilities to determine a net or average entropy for the data input signal which may be used in various applications to enhance the quality determinations of communications channels and encoders.

What is claimed is:

1. A method of quantifying perceptual information and perceptual entropy for a data input signal comprising the steps of:

generating from the data input signal according to a corresponding perceptual model a perceptual response; and quantifying the perceptual response to produce perceptual information and perceptual entropy, wherein perceptual entropy is a single number.

2. The method as recited in claim 1 wherein the quantifying step comprises the steps of:

transforming the perceptual response to a set of coefficients; and entropy converting the set of coefficients to produce perceptual information and perceptual entropy.

3. The method as recited in claim 2 wherein the transforming step comprises the step of applying a Karhunen-Loeve transform to the perceptual response to produce the set of coefficients.

4. The method as recited in claim 2 or 3 wherein the entropy converting step comprises the steps of:

calculating probabilities for amplitudes of the coefficients based on coefficient histograms of massive tests; and calculating perceptual information and perceptual entropy from the probabilities.

5. A method of producing a perceptual entropy measurement for a data input signal comprising the steps of:

generating a perceptual response from the data input signal according to a corresponding perceptual model; and performing an entropy conversion on the perceptual response to produce a single number representing the perceptual entropy.

6. The method as recited in claim 5, wherein the step of performing the entropy conversion step comprises the steps of:

transforming the perceptual response to a set of coefficients; and entropy converting the set of coefficients to produce the perceptual entropy.

7. The method as recited in claim 6, wherein the entropy converting step comprises the steps of:

calculating probabilities for the amplitudes of the coefficients based on coefficient histograms of massive tests; and calculating the perceptual entropy from the probabilities.

8. A method of measuring the efficiency of a codec under test comprising the steps of:

generating a first perceptual response from the data input signal according to a corresponding perceptual model;

performing an entropy conversion on the first perceptual response to produce a single number representing the input perceptual entropy;

generating a second perceptual response from the data output signal according to the corresponding perceptual model;

performing an entropy conversion on the second perceptual response to produce a single number representing the output perceptual entropy; and determining the difference between the input perceptual entropy and the output perceptual entropy.

* * * * *